United States Patent

Iachine et al.

(10) Patent No.: US 6,174,224 B1
(45) Date of Patent: Jan. 16, 2001

(54) METHOD AND APPARATUS FOR COOLING AND/OR LUBRICATION OF A WORK HEAD

(76) Inventors: Serguei Iachine, Naukistr. 13.b.3.52; Valeri Tsarev, Vavilovstr., 4.b.1. 159, both of RU-St. Petersburg (RU); Viljo Olavi Kilpeläinen; Lilia Lappalainen, both of Unnukanniementie 66, FIN-78200 Varkaus (FI)

( * ) Notice: Under 35 U.S.C. 154(b), the term of this patent shall be extended for 0 days.

(21) Appl. No.: 09/242,835

(22) PCT Filed: Sep. 23, 1997

(86) PCT No.: PCT/FI97/00567

§ 371 Date: Feb. 24, 1999

§ 102(e) Date: Feb. 24, 1999

(87) PCT Pub. No.: WO98/12017

PCT Pub. Date: Mar. 26, 1998

(30) Foreign Application Priority Data

Sep. 23, 1996 (FI) ....................................................... 963767

(51) Int. Cl.[7] .................................................. B24B 55/02
(52) U.S. Cl. ................................ 451/53; 451/7; 451/449; 451/450; 451/165
(58) Field of Search .............................. 457/53, 449, 450, 457/7, 165

(56) References Cited

U.S. PATENT DOCUMENTS

| 2,851,764 | 9/1958 | White . |
| 4,514,149 | 4/1985 | Kanebako et al. . |
| 5,228,369 | * 7/1993 | Itoh et al. ................................ 451/7 |
| 5,603,655 | * 2/1997 | Kaneko et al. ......................... 451/53 |
| 5,833,523 | * 11/1998 | Hykes ................................. 451/450 |
| 5,961,376 | * 10/1999 | Gottschald .............................. 451/53 |

FOREIGN PATENT DOCUMENTS

| 3338739 | 11/1984 | (DE) . |
| 0120599 | 10/1984 | (EP) . |

(List continued on next page.)

OTHER PUBLICATIONS

Ovsepjan et al., 1977, Brief presentation theses at the VIII pan–soviet scientific and production conference on electrophysical and electrochemical working methods ELFA–77, De. 13–5( with English abstract).

(List continued on next page.)

Primary Examiner—David A. Scherbel
Assistant Examiner—George Nguyen
(74) Attorney, Agent, or Firm—Klauber & Jackson

(57) ABSTRACT

The invention relates to a workhead for mechanical working of materials. This invention is directed to metal working machines and is adaptable for use in the mechanical working of metals and plastics, involving the use of liquid lubricants and/or coolants. The technical result achieved by implementing the invention comprises an improvement in the efficiency of the cavitation treatment of a liquid lubricant and/or coolant, which secures the dispersion of a solid lubrication in aqueous solutions, an increase in the stability of water-in-oil emulsions, decomposition of a liquid lubricant and/or coolant and a decrease of viscosity, an improvement in corrosion resistance, reduction in a tool wear and, simultaneously, an improvement in the quality of a working surface. The apparatus comprises a housing (1), inside which is fitted a main oscillator (2), to which is connected a tool (4) through the intermediary of an extension piece (3). The apparatus includes a pipeline (6) for supplying a liquid lubricant and/or coolant into the housing (1) and a pipeline (7) for delivering the liquid lubricant and/or coolant from the housing onto a working area. A spring (8) is intended for pressing the housing (1), the extension piece (3), and the tool (4) against a workpiece(9). The pipeline (6) is fitted with a hydrostatic pressure regulator (10). The pipelines (6) and (7) are fitted with hydrodynamic additional oscillators (11).

8 Claims, 2 Drawing Sheets

FOREIGN PATENT DOCUMENTS

| | | |
|---|---|---|
| 1155652 | 10/1984 | (GB) . |
| 314273 | 6/1966 | (SE) . |
| 1514506 | 10/1989 | (SU) . |

OTHER PUBLICATIONS

Khudibin, 1971, "Lubricant–Coolants Used for Gringing", PP 96–7, Publisher"Machinostryenlye", Moscow( with English abstract).

* cited by examiner

METHOD AND APPARATUS FOR COOLING AND/OR LUBRICATION OF A WORK HEAD

BACKGROUND OF THE INVENTION

1. Field of the Invention

The present invention relates to a workhead intended for metal working machines, which is adaptable for use in such mechanical working of metals and plastics involving the use of liquid lubricants and/or coolants. Hence, the term mechanical working encompasses various machining operations, such as turning, grindings etc. as well as non-cutting treatment of surfaces to be worked, such as for example the use of various pressing tools for finishing a surface. The invention relates also to a method for mechanical working of materials with a workhead, including a tool acting on a surface to be worked and means for supplying a liquid lubricant and/or coolant onto the working area of a surface to be treated.

2. Description of the Related Art

The publication "Ovsepjan G. S., Suvorov A. A. The effect of ultrasonic vibrations of a liquid lubricant and/or coolant on the characteristics of a cutting process. Brief presentation theses at the VIII Pan-soviet scientific and productional conference on electrophysical and electrochemical working methods ELFA-77 (Dec. 13–15, 1977), Leningrad", discloses an apparatus for working of metals by cutting, said apparatus comprising a power supply, a tool, a magnetostriction converter, and a concentrator, inside which is an axial conduit for supplying a liquid lubricant and/or coolant onto the cutting area. When flowing through said conduit, the liquid lubricant and/or coolant is subjected to an ultrasound treatment which improves its lubricating and cooling properties and reduces the degree of plastic strain within the chip-forming area. A defect in this prior known apparatus is that the ultrasound treatment of a liquid lubricant and/or coolant is not sufficiently effective due to small amounts of liquid lubricant and/or coolant subjected to the treatment and due to a short duration of the ultrasound oscillation applied thereto as well as due to the location of a concentrator in the proximity of a surface to be treated, which is why this apparatus can only make use of liquid lubricants and/or coolants at a low viscosity without homogeneous and heterogeneous additives.

In terms of technical significance and achieved result, closest to the apparatus of this invention is what is disclosed in the publication "Hudobin L. V. Lubricants and/or coolants used in grinding. M.,'Mashinostrojenie', 1971, prototype" as an ultrasound device for cleaning grinding wheels, comprising a concentrator and a magnetostriction converter rigidly secured to a curving corrugated tube. The converter, accompanied by its concentrator, is fitted in cylindrical housing, which is also provided with a pipe and a connector for supplying a liquid lubricant and/or coolant onto the working surface.

When the apparatus is operating, the cylindrical housing is supplied through the connecting pipe with a liquid lubricant and/or coolant, which fills the pipe to the top surface and runs through this pipe and the connector to the end of the corrugated tube and onto the working surface of a grinding wheel. From an ultrasound generator extends a supply to a magnetostriction converter and concurrently the liquid lubricant and/or coolant as well as the corrugated tube are subjected to ultrasound oscillations. By virtue of the wave-like movement of liquid and the cavitation of liquid, the action on the surface of a grinding wheel through the liquid intensifies vigorously, this surface is cleared of metal particles and grinding residues, greasiness is reduced, and working efficiency of the grinding wheel is improved.

A defect in this prior known apparatus is a low efficiency of the ultrasound treatment, which is why it cannot be used with liquid lubricants and/or coolants, which are organic mixture blends and which contain for example asphaltenes—resins which have a lower thermal stability and solubility than aromatic hydrocarbons. This type of liquid lubricants and/or coolants are needed when working metals by cutting, grinding, turning, drilling etc. In addition, when using the prior known apparatus, it is not possible to achieve a necessary stability for water-in-oil emulsions, the decrease of viscosity is slight and so is the increase in the anti-bacterial resistance of a liquid lubricant and/or coolant.

SUMMARY OF THE INVENTION

The mission to be accomplished by the invention encompasses the construction of a workhead for metal working machines, which has high operating qualities and which is capable of securing a.o. a minimal wear of the tool and a high quality for a surface to be treated.

In order to achieve this object, a workhead of the invention is characterized by what is set forth in the characterizing portion of claim 1. On the other hand, a method of the invention is characterized by what is set forth in the characterizing portion of claim 7.

The technical result achieved by implementing the invention comprises an improvement in the efficiency of the cavitation treatment of a liquid lubricant and/or coolant, which secures the dispersion of a solid lubrication in aqueous solutions, an increase in the stability of water-in-oil emulsions, decomposition of a liquid lubricant and/or coolant and a decrease of viscosity, an improvement in corrosion resistance. As a result of the improved quality of a liquid lubricant and/or coolant, the wear of tools is reduced, with blades, for example, a 1,5–2-fold reduction, and simultaneously the quality of a working surface and the geometrical properties thereof are improved. By virtue of the improved anti-bacterial resistance of a liquid lubricant and/or coolant, the service life of such liquid increases, thus reducing the consumption thereof.

An object of this invention resides in the fact that a workhead intended for mechanical working of various materials, such as metals, plastics, which includes an electromechanical converter, rigidly engaged with an extension element, located in a housing chamber filled with a liquid lubricant and/or coolant, a tool, a power supply with its winding, pipelines in a flow communication with the chamber for supplying and discharging the liquid lubricant and/or coolant, is provided with at least one hydrodynamic additional oscillator, which is placed in the liquid lubricant and/or coolant supply and discharge pipelines or in the same housing with the electromechanical converter, said additional oscillator having an operating frequency which is 1,5–3 "$10^5$ times higher than the frequency of the main converter, and that the liquid supply pipe of the chamber is fitted with a hydrostatic pressure regulator. In one embodiment, the apparatus is provided in the upper portion of the housing with a gas supply pipe, which is fitted with a pressure regulator. The electromechanical converter may comprise electromagnetic, magnetostriction, electrostriction, electrodynamic and other oscillators, which convert the energy of an electrical current into mechanical oscillatory motions.

The characterizing features of an apparatus of the invention, such as the presence of an additional oscillator, secure at least a two-frequency cavitation treatment for the liquid lubricant and/or coolant, which substantially improves the liquid quality. The conducted studies have proved that the cooperation between two-frequency cavitation fields separated by an order (order of 8) or more enhances considerably the efficiency of a process action for a liquid lubricant and/or coolant, depending on the adaptation of the frequencies of cavitation fields, the amplitudes of pressures, and the static distribution feature of the dimensions of cavitation embryos. Some of the cavitation cavities, formed by the action of hydrodynamic emitters, collapse. At the same time, the action of the forces of a low-frequency field is combined with a static pressure, which leads to an improvement in the efficiency of the action of cavitation of a single cavity. Simultaneously, the high-frequency field creates the oscillations of cavitation cavities. As a result of the forces of a second frequency, the expansion rate of a single cavity at first increases until the cavity dimensions surpass the resonance and then diminish.

As a result of this, the cavity reaches a maximum radius in the earlier phase of a low-frequency field, as the amplitude of pressure is at its maximum. In other words, the energy of the cavity increases vigorously during the collapse and cuts down the collapsing time. Simultaneously, the actions of acoustic currents and radiation pressure gain strength, the audio-capillary effect will be more pronounced. The workpiece develops various microscopic crystal imperfections, the working surfaces, affected adversely by oxygen, become oxidized. This improves the chemical adsorption of the reagents of liquid lubricants and/or coolants, improves the adhesion thereof to a surface to be treated. In addition, the adsorption of the reagents of a liquid lubricant and/or coolant onto the surfaces of solid lubrication particles decreases the adhesion forces therebetween and prevents the sintering of particles, while activating the cleaning and lubricating properties. The emulsion becomes low-dispersive. During the two-stage treatment, pH rises above 9,6 and this enhances the anti-bacterial resistance of a liquid lubricant and/or coolant, since the development of bacteria ceases at a pH>9,6. The presence of a gas pipe and a gas pressure regulation in the apparatus allows the development of a positive pressure in the housing, which enhances even further the dispersion effect of the solid and poorly soluble additives of a liquid lubricant and/or coolant. Nitrogen improves the durability of a hard alloy tool.

The invention will now be described in more detail with reference made to the accompanying drawings.

DETAILED DESCRIPTION OF THE PREFERRED EMBODIMENTS

Figure 2:
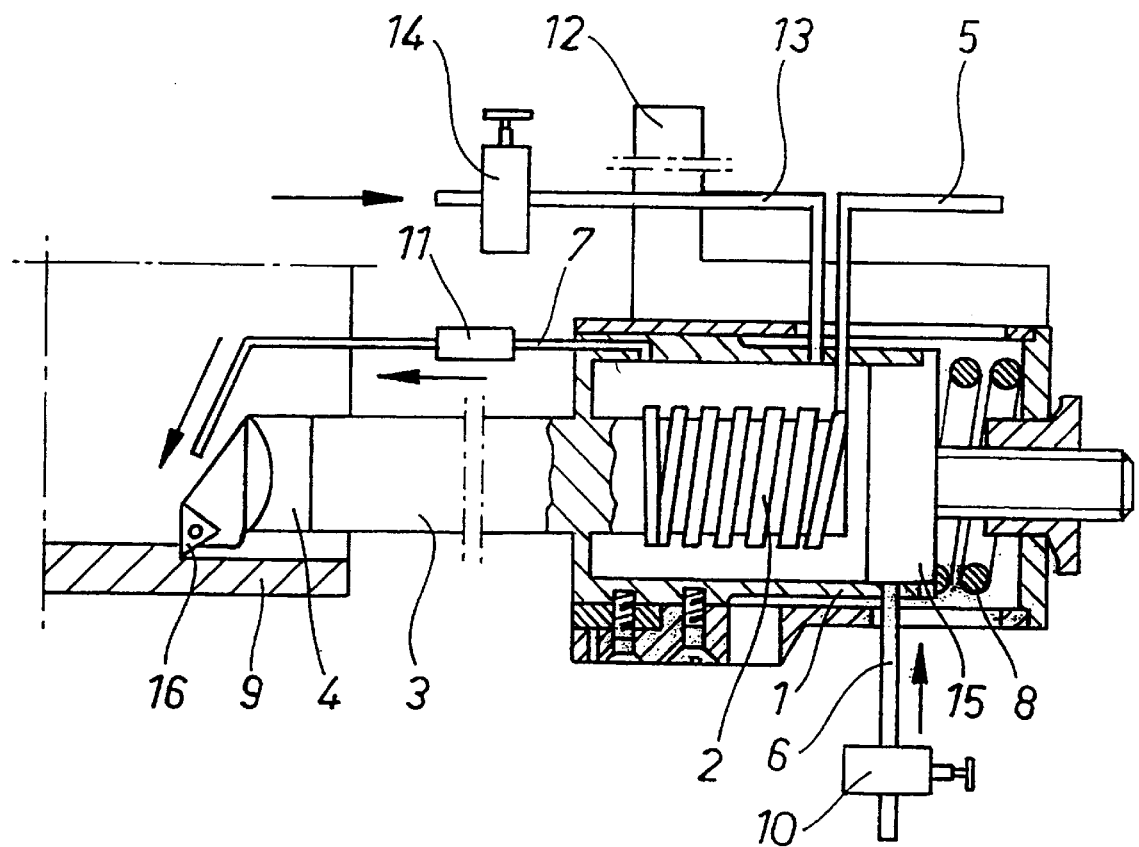
FIG. 2 shows another embodiment for an apparatus of the invention in a schematic view.

As shown in the figures, the apparatus includes a housing 1, whose internal chamber space is fitted with an oscillator 2 (an electromechanical converter), to which is connected a disc roller 4 through the intermediary of an extension piece 3. To the oscillator 2 extends a power supply 5. A pipeline 6 is intended for supplying a liquid lubricant and/or coolant into the housing 1 and a pipeline 7 for delivering the liquid lubricant and/or coolant from the housing 1 onto a working area. A spring 8 is intended for pressing the housing 1, the extension piece 3, and the tool 4 against a workpiece 9. On the pipeline 6 is mounted a hydrostatic pressure regulator 10. The pipelines 7 and 6 are fitted with hydrodynamic emitters 11. A workhead is secured to the cradle of a working machine by means of a tool holder 12. In the second embodiment of the apparatus (see FIG. 2), the top portion of the housing 1 is fitted with a pipeline 13 for supplying nitrogen through a static gas pressure regulator 14. The housing 1 is further provided with a hydrodynamic vortex converter 15 and the tool employed is a slotting tool 16. The working machine can be a flattening machine.

The apparatus operates as follows.

Figure 1:
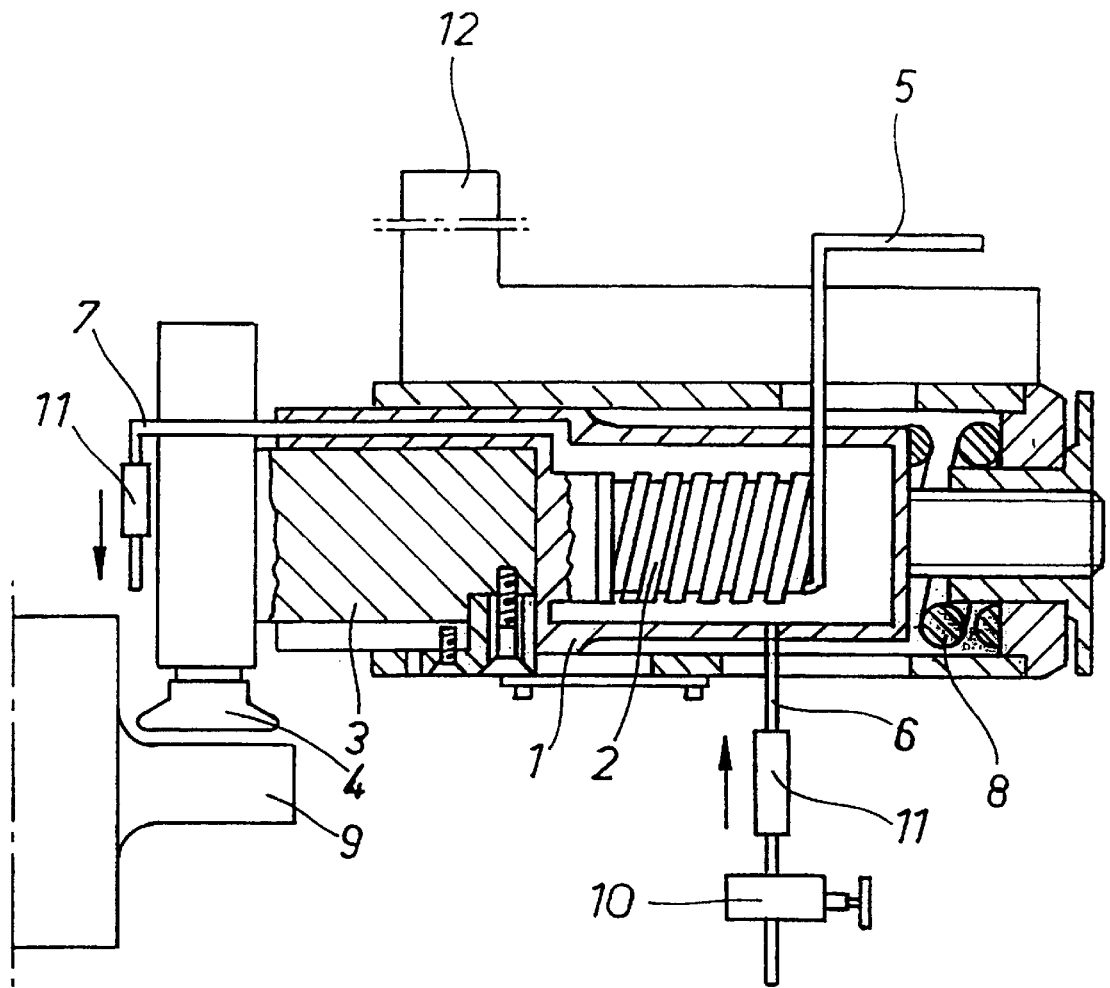
FIG. 1 shows one embodiment for an apparatus of the invention in a schematic view.

Before starting, the workhead is secured by means of the tool holder 12 to the cradle of a working machine. In FIG. 1, the tool 4 is shown in the starting position out of contact with a surface to be treated. Thereafter, the housing 1 is filled with a liquid lubricant and/or coolant (e.g. Castrol Syntilo R4) through the hydraulic hydrostatic-pressure regulator 10, the emitter 11, and the pipeline 6. By means of the regulator 10, the liquid-filled cavity develops a positive pressure of 1,2 MPa. Under the elevated static pressure, the cavitation enhances intensely the destruction process of soiled adsorption surfaces. As the liquid lubricant and/or coolant flows through the pipeline 7 and the second hydrodynamic oscillator 11, it will reach the working surface to moisten the tool surface 4 and the workpiece 9, which are in contact with each other during the machine operation. Upon receiving electricity through the power supply 5, the oscillator 2 begins its function. Simultaneously the oscillators 11, which operate at high frequencies (e.g. 2 MHz), start applying their action on the liquid lubricant and/or coolant. The main oscillator 2 has an operating frequency of e.g. 10 Hz. Hence, the liquid lubricant and/or coolant will be subjected in the workhead to a two-stage treatment on common two-frequency fields: those of a low frequency and a high frequency. When machining materials by cutting, the housing 1 is secured. When machining is effected with flattening mechanisms, the clamp is released and a necessary press force for the tool 4 against a workpiece is produced by means of the spring 8.

By picking up heat from the converter 2, the liquid lubricant and/or coolant warms up to some extent and is carried through the hydrodynamic oscillator 11 to a working area in the form of a flux of extremely small particles. After the two-stage treatment, the components of the liquid lubricant and/or coolant disperse and develop free radicals, which are subjected to a chemical reaction with the contact surfaces 4 and 9. At the same time, the liquid lubricant and/or coolant attains excellent moistening qualities and, as a result of the audio-capillary effect, penetrates into micropores existing in the surface of the piece 9 and the tool 4 and into the depressions of micro-irregularities.

In a single implementation (see FIG. 2), the two-frequency treatment of a liquid lubricant and/or coolant is handled by means of a hydrodynamic vortex converter 15, which produces the liquid cavitation; the tool comprises a slotting tool 16. The pipeline 13 is used to supply the top portion of the housing 1 with nitrogen for attaining a positive pressure for the electromechanical converter. The rate of positive pressure is controlled by means of the regulator 14. The nitrogen gas improves the durability of a hard alloy tool in the working area.

What is claimed is:

1. A workhead for mechanical working of materials, said workhead comprising a main oscillator, rigidly engaged with an extension piece and placed in the chamber of a housing filled with at least one of a liquid lubricant and a coolant, which produces a cavitation, a tool, and supply and discharge pipes for the at least one of a liquid lubricant and a coolant in a flow communication with said chamber, characterized in that the workhead is provide with at least one additional oscillator, which operates at a frequency different from that of the main oscillator essentially all the time, said additional oscillator being included in the supply and or discharge pipelines for the at least one of a liquid lubricant and a coolant or in the same housing as the main oscillator, said additional oscillator producing an addition cavitation.

2. A workhead as set forth in claim 1, wherein the liquid supply pipe of the chamber is fitted with a hydrostatic pressure regulator.

3. A workhead as set forth in claim 1, wherein the top portion of the housing is provided with a gas supply pipe, which is fitted with a pressure regulator.

4. A workhead as set forth in claim 1, wherein at least one additional oscillator, mounted on the supply and/or discharge pipes for said at least one of a liquid lubricant and a coolant, has an operating frequency which is $1,5-3 \times 10^5$ times higher that the frequency of the main oscillator.

5. A workhead as set forth in claim 1 wherein the main oscillator comprises an electromechanical converter.

6. A workhead as set forth in claim 1, wherein the additional oscillator comprises a hydrodynamic oscillator.

7. A method for mechanically working a material having a surface to be treated with a workhead, said method comprising the steps of:

(a) causing a tool to act upon the surface to be treated;

(b) providing at least one of a liquid lubricant and a coolant;

(c) setting the at least one of a liquid lubricant and coolant in oscillation at least at two different frequencies;

(b) delivering at least one of a liquid lubricant and a coolant of step (c) onto the working area of the surface to be treated.

8. A method for mechanically working a material having a surface to be treated with a workhead as defined in claim 7 wherein said step (c) includes setting the at least one of a liquid lubricant and a coolant in oscillation at a higher and lower frequencies and wherein the higher frequency is $1,5-3 \times 10^5$ higher than the lower frequency.

* * * * *